United States Patent
Greenwood et al.

(10) Patent No.: US 11,083,067 B2
(45) Date of Patent: Aug. 3, 2021

(54) ELECTRICAL POWER SUPPLY WITH REMOVABLE PLUG-IN CARTRIDGE

(71) Applicants: Simon Richard Greenwood, Cheshire (GB); Scott Rhodes, Tampa, FL (US)

(72) Inventors: Simon Richard Greenwood, Cheshire (GB); Scott Rhodes, Tampa, FL (US)

(73) Assignee: Hatch Transformers, Inc., Tampa, FL (US)

( * ) Notice: Subject to any disclaimer, the term of this patent is extended or adjusted under 35 U.S.C. 154(b) by 2079 days.

(21) Appl. No.: 14/053,186

(22) Filed: Oct. 14, 2013

(65) Prior Publication Data

US 2014/0265932 A1  Sep. 18, 2014

Related U.S. Application Data

(63) Continuation-in-part of application No. 13/838,251, filed on Mar. 15, 2013, now abandoned.

(51) Int. Cl.
*H05B 47/10* (2020.01)
*H05B 45/37* (2020.01)
*H02M 1/00* (2006.01)

(52) U.S. Cl.
CPC ............. *H05B 47/10* (2020.01); *H05B 45/37* (2020.01); *H02M 2001/0025* (2013.01)

(58) Field of Classification Search
CPC ............... H05B 37/02; H05B 33/0815; H05B 33/0812; H05B 33/089; Y10T 307/406; H02M 2001/0025
USPC .......................... 429/21; 345/204; 340/815.4
See application file for complete search history.

(56) References Cited

U.S. PATENT DOCUMENTS

| | | | |
|---|---|---|---|
| 5,347,211 A | 9/1994 | Jakubowski | |
| 5,426,348 A * | 6/1995 | Qi | H05B 41/282 315/209 R |
| 6,095,850 A * | 8/2000 | Liu | G01R 13/02 439/488 |
| 6,643,158 B2 * | 11/2003 | McDonald | G06F 1/263 363/142 |
| 7,322,718 B2 * | 1/2008 | Setomoto | H05B 45/46 362/276 |
| 7,995,314 B2 * | 8/2011 | Titus | H02H 3/04 361/42 |
| 8,979,299 B2 * | 3/2015 | Hsia | F21V 23/009 362/221 |
| 9,363,862 B1 * | 6/2016 | Xiong | G05F 1/10 |
| 9,713,209 B2 * | 7/2017 | Ackmann | H05B 45/14 |
| 2003/0201676 A1 | 10/2003 | Su | |

(Continued)

FOREIGN PATENT DOCUMENTS

DE          20208232 U1    8/2002
DE   10 2008 001 954 A1   8/2009

(Continued)

*Primary Examiner* — Emily P Pham
(74) *Attorney, Agent, or Firm* — Reinhart Boemer Van Deuren P.C.

(57) ABSTRACT

A method of supplying electrical power to a load is provided. The method includes the step of providing a removable plug-in cartridge having markings related to a desired value of an electrical output of a power supply unit. The method further includes configuring the power supply unit to receive the removable plug-in cartridge such that the removable plug-in cartridge operates to set an output value of the power supply to the desired value.

17 Claims, 4 Drawing Sheets

(56) References Cited

U.S. PATENT DOCUMENTS

| | | | |
|---|---|---|---|
| 2003/0210503 A1 | 11/2003 | McConaughy | |
| 2004/0165629 A1* | 8/2004 | Iwakura | H01S 3/0941 372/38.02 |
| 2004/0259436 A1 | 12/2004 | Su | |
| 2006/0133435 A1* | 6/2006 | Ikeda | H01S 5/042 372/38.02 |
| 2007/0090796 A1 | 4/2007 | Norris | |
| 2007/0278859 A1 | 12/2007 | Su | |
| 2008/0030931 A1 | 2/2008 | Kozak et al. | |
| 2008/0144294 A1 | 6/2008 | Adest et al. | |
| 2009/0212757 A1 | 8/2009 | Su | |
| 2009/0303209 A1* | 12/2009 | Teng | G09G 3/20 345/204 |
| 2009/0325009 A1 | 12/2009 | Kim et al. | |
| 2010/0194367 A1* | 8/2010 | Lund | H02M 3/33523 323/284 |
| 2011/0241557 A1* | 10/2011 | Grotkowski | H05B 33/0824 315/246 |
| 2011/0261592 A1* | 10/2011 | Samejima | H02M 1/32 363/21.02 |
| 2011/0278924 A1* | 11/2011 | Hung | G06F 1/26 307/31 |
| 2012/0010684 A1 | 1/2012 | Owens et al. | |
| 2012/0169256 A1* | 7/2012 | Suda | B25B 21/00 318/17 |
| 2012/0262961 A1* | 10/2012 | Chien | H02M 3/33507 363/84 |
| 2012/0274216 A1* | 11/2012 | Datta | H05B 33/0815 315/127 |
| 2012/0326618 A1* | 12/2012 | Kim | H05B 33/0818 315/224 |

FOREIGN PATENT DOCUMENTS

| | | |
|---|---|---|
| EP | 0 409 226 A2 | 1/1991 |
| JP | 3124307 U | 7/2006 |
| KR | 20040091030 A | 10/2004 |
| KR | 20-0393030 | 8/2005 |
| TW | 563962 U | 11/2003 |
| TW | 200802432 A | 1/2008 |

* cited by examiner

ELECTRICAL POWER SUPPLY WITH REMOVABLE PLUG-IN CARTRIDGE

CROSS-REFERENCE TO RELATED PATENT APPLICATIONS

This patent application is a Continuation-in-Part of co-pending U.S. patent application Ser. No. 13/838,251, filed Mar. 15, 2013, the entire teachings and disclosure of which are incorporated herein by reference thereto.

FIELD OF THE INVENTION

This invention generally relates to electrical power supplies, and more particularly to power supplies for LED lighting systems. Furthermore, this invention relates to a novel method for controlling the regulated output of a power supply for lighting applications.

BACKGROUND OF THE INVENTION

Typically, conventional power supplies are designed to provide an electrical output at a predetermined current level or at a predetermined voltage level, known as a regulated output. These power supplies generally include a circuitry to provide the aforementioned current and/or voltage levels sealed within a housing. In some cases, this regulated output current/voltage is not designed to be modified and therefore is not accessible to the user. If the user requires electrical power at a variety of voltage and/or current levels, a separate power supply might need to be purchased for each voltage and/or current level desired. As such, users may be forced to acquire a number of different power supplies at considerable expense. Suppliers and resellers of these power supplies are forced to keep inventories of the many different output configurations such that the correct output configuration is available when needed.

A lighting fixture manufacturer may produce many different lighting fixtures with similar electrical power requirements, each separate lighting fixture requiring a different electrical output configuration from the power supply. Thus, each separate lighting fixture may require a separate lighting power supply to be maintained in stock. Therefore, there exists a need in the industry for the lighting fixture manufacturer to maintain stock of a lighting power supply that can be easily configured to deliver the electrical requirements of each separate fixture. This relieves the burden of accurately forecasting individual product sales and maintaining lighting power supply inventory for each separate lighting fixture.

In other cases, the power supply may include a plurality of output connections, each different connection corresponding to a different regulated output current/voltage. Other power supplies have jumpers on a circuit board, or a dip switch for selecting a desired regulated output current/voltage level. Also, some power supplies may have a separate input to read a resistor value placed on the load, signifying the desired output current/voltage level. These systems are error-prone and could easily result in the wrong output voltage or current being selected by the user. A wrong output voltage or current could result in the fixture overheating due to the fixture not being designed for an increased power load, resulting in premature failure or an unsafe operating condition. Other programmable power supplies have the ability to adjust the output electrical characteristics by programming serially via RS232 or similar protocol. However, this requires the unit to be powered and is difficult to implement in a manufacturing environment. There exists a need in the industry, for fixture manufacturers to adjust the regulated output current/voltage level in a manner that does not allow the regulated output current or output voltage level to be adjusted by the end customer. A system is needed that gives the lighting fixture manufacturer the flexibility to adjust the electrical output characteristics, without enabling the electrical output characteristics to be adjusted after the product has left the manufacturing environment.

Embodiments of the present invention address the aforementioned problems and represent an advancement over the current state of the art with respect to electrical power supplies. Certain advantages of the invention, as well as various inventive features thereof, will be apparent from the description of the invention provided herein.

BRIEF SUMMARY OF THE INVENTION

In one aspect, embodiments of the invention provide a power supply that supplies electrical power at a predetermined level. The power supply includes circuitry configured to receive an electrical input and produce an electrical output. The power supply further includes a housing with an opening configured to receive a removable plug-in cartridge. The removable plug-in cartridge is configured to control the regulated output characteristic of the power supply. Examples of output characteristics that could be controlled include the following: output current, output voltage, output power, relative values of output current and/or voltage for multi-output power supplies that control the light source's correlated color temperature (CCT), wavelength of light (color), . . . etc. In particular embodiments, the power supply is configured to supply power to a light-emitting diode (LED) lighting system, a compact fluorescent (CFL) lighting system, a high-intensity discharge (HID) lighting system, an incandescent lighting system, or a hybrid combination of the aforementioned. Further, the power supply may be configured to supply electrical power in a range from 1 watt to 100 watts, and accommodate electrical inputs ranging from 90 volts to 300 volts.

In a particular embodiment, the removable plug-in cartridge sets the current output of the power supply to a predetermined current level. The removable plug-in cartridge may include a resistive element, and circuitry inside the power supply detects the value of the resistive element that sets the desired value of the regulated output current.

In an alternate embodiment, the removable plug-in cartridge sets the voltage output of the power supply to a predetermined voltage level, or may have circuitry designed to output a constant voltage regardless of the voltage and current levels of the electrical input.

In certain embodiments, the plug-in cartridge is marked with a current value, and the plug-in cartridge is configured to set the current level of the electrical output to the current value, while in other embodiments, the plug-in cartridge is marked with a voltage value, and the plug-in cartridge is configured to set the voltage level of the electrical output to the voltage value.

In an embodiment of the invention, the removable plug-in cartridge is configured to interrupt a flow path between one or more beams light sources and one or more respective photodiodes, wherein the pattern of light detected by the photodiodes determines a current or voltage value of the electrical output. Alternatively, the circuitry and the removable plug-in cartridge may include corresponding inductively-coupled elements, wherein a parameter of the inductively-coupled elements determines a current or voltage value of the electrical output. The inductively-coupled elements may include some combination of magnetic components and reed switches, or, in alternate embodiments, may include a Hall Effect device.

In a further embodiment, the circuitry for the power supply includes two connectors, and wherein the removable plug-in cartridge has two electrical terminals, each designed to be inserted into a respective one of the two connectors.

In another aspect, embodiments of the invention provide an LED driver for providing electrical power to an LED lighting unit. The LED driver includes circuitry configured to receive an electrical input and produce an electrical output. The LED driver further includes a housing with an opening configured to receive a removable plug-in cartridge. The removable plug-in cartridge is configured to set the electrical power output to the predetermined level. Alternate embodiments of the invention include CFL and HID ballast circuits configured to provide power for either CFL or HID lighting systems.

The LED driver may be configured as a constant-current LED driver, or as a constant-voltage LED driver. Similarly, the CFL and/or HID ballasts may be configured to deliver constant current or constant voltage. Furthermore, a CFL and/or HID ballast may be configured to deliver a configurable voltage and/or current appropriate for the desired lamp.

In another embodiment, the removable plug in cartridge is configured to adjust the relative output current or output voltage of a plurality of outputs of a given power supply. As an example, an LED driver could be equipped with two outputs each coupled to a different LED with different CCT (correlated color temperatures) values. For example, one LED could have a CCT value of 2700 Kelvin and the other LED have a CCT value of 4200 Kelvin. The removable plug-in cartridge in the LED driver could then select the relative value of current or voltage being provided to each LED, creating a selectable white light with a CCT value in between each of connected LEDs. Furthermore, each output could be coupled to a different color LED and adjusting the relative values of each output could result in the desired color of the light output.

In yet another aspect, embodiments of the invention include a method of supplying electrical power to a load. The method includes the step of providing a removable plug-in cartridge having markings related to a desired value of an electrical output of a power supply unit. The method further includes configuring the power supply unit to receive the removable plug-in cartridge such that the removable plug-in cartridge operates to set an output value of the power supply to the desired value.

In certain embodiments, the desired value is a current value and the power supply unit is a constant-current power supply unit, while in alternate embodiments, the desired value is a voltage value and the power supply unit is a constant-voltage power supply unit. Yet in other embodiments, the desired value is a color temperature value.

Further, the desired value may also be a relative value, and the removable plug-in cartridge may be configured to set the output value for the power supply unit relative to an input value for the power supply unit.

In a particular embodiment, the method includes configuring the removable plug-in cartridge to modify one of a reference current and a reference voltage in order to maintain the output value of the power supply unit at the desired value. In more particular embodiments, the method includes measuring the current from a load being supplied by the power supply unit, comparing the measured current from the load to the reference current, and using the results of said comparing to adjust the current supplied to the load.

In at least one embodiment, the power supply unit has a plurality of outputs, and the method includes providing a removable plug-in cartridge configured to set output values for the plurality of outputs. Separate negative feedback control systems, each configured to compare a reference current to a power supply unit load current, may be provided for each of the plurality of outputs. Alternatively, separate negative feedback control systems, each configured to compare a reference voltage to a power supply unit load voltage, may be provided for each of the plurality of outputs.

In another aspect, embodiments of the invention include a power supply that provides electrical power at a predetermined level. The power supply has a housing with an opening configured to receive a removable plug-in cartridge which includes an attribute that is representative of a desired output value for the power supply. The removable plug-in cartridge is configured to modify one of a reference current and a reference voltage in order to maintain an output value for the power supply at the desired output value.

In certain embodiments, the removable plug-in cartridge is marked with one of a current value or voltage value, the removable plug-in cartridge being configured to set an output value of the power supply to the respective current value or voltage value. In alternate embodiments, the removable plug-in cartridge is marked with a relative value, the removable plug-in cartridge being configured either to set an output current level relative to an input current level, or to set an output voltage level relative to an input voltage level.

In a particular embodiment, the removable plug-in cartridge is configured to set one or more desired output values for a power supply having a plurality of outputs. The claimed power supply may further include a separate negative feedback control system for each of the plurality of outputs. The negative feedback control system may be configured to compare a reference current to a power supply load current, wherein the negative feedback control system determines a difference between the reference current and load current, the difference being used by the negative feedback control system to adjust a power supply output current. Or, alternatively, the negative feedback control system may be configured to compare a reference voltage to a power supply load voltage, wherein the negative feedback control system determines a difference between the reference voltage and load voltage, wherein the difference is used by the negative feedback control system to adjust a power supply output voltage.

In a particular embodiment, the power supply includes a negative feedback control system, wherein the negative feedback control system and the removable plug-in cartridge include corresponding inductively-coupled elements, wherein a parameter of the inductively-coupled elements determines the reference current or the reference voltage, the inductively-coupled elements including a combination of magnetic components and reed switches.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

While embodiments of the present invention are described herein with respect to their use in Light-Emitting Diode (LED), compact fluorescent light (CFL), high-intensity discharge (HID) lighting systems, and incandescent lighting systems, one of skill in the art will recognize that the invention is not necessarily limited to this type of application. Nothing disclosed herein is intended to limit the invention to use with LED, CFL, HID, or incandescent lighting systems. It is envisioned that the subject matter of this application may find uses in other types of lighting systems, or in any number of applications where output electrical characteristics are desired to be selected after the time of manufacture of the lighting power supply.

Power supplies for the aforementioned lighting systems, also referred to as LED drivers, CFL ballasts, HID ballasts, or incandescent power supplies may provide AC power or DC power depending on the design of the lighting system. DC lighting system power supplies may be configured to supply either constant current, constant voltage, or constant power. For example, constant-current LED drivers are typically used to drive a group of LEDs wired in series, while constant-voltage LED drivers are typically used to drive a group of LEDs wired in parallel. The power output of these power supplies may vary widely. For example, systems that provide electrical power from 1 watt to 100 watts are typical. Further, these systems may be capable of accepting a wide range of input voltages, for example from 90 volts to over 300 volts.

Figure 1:
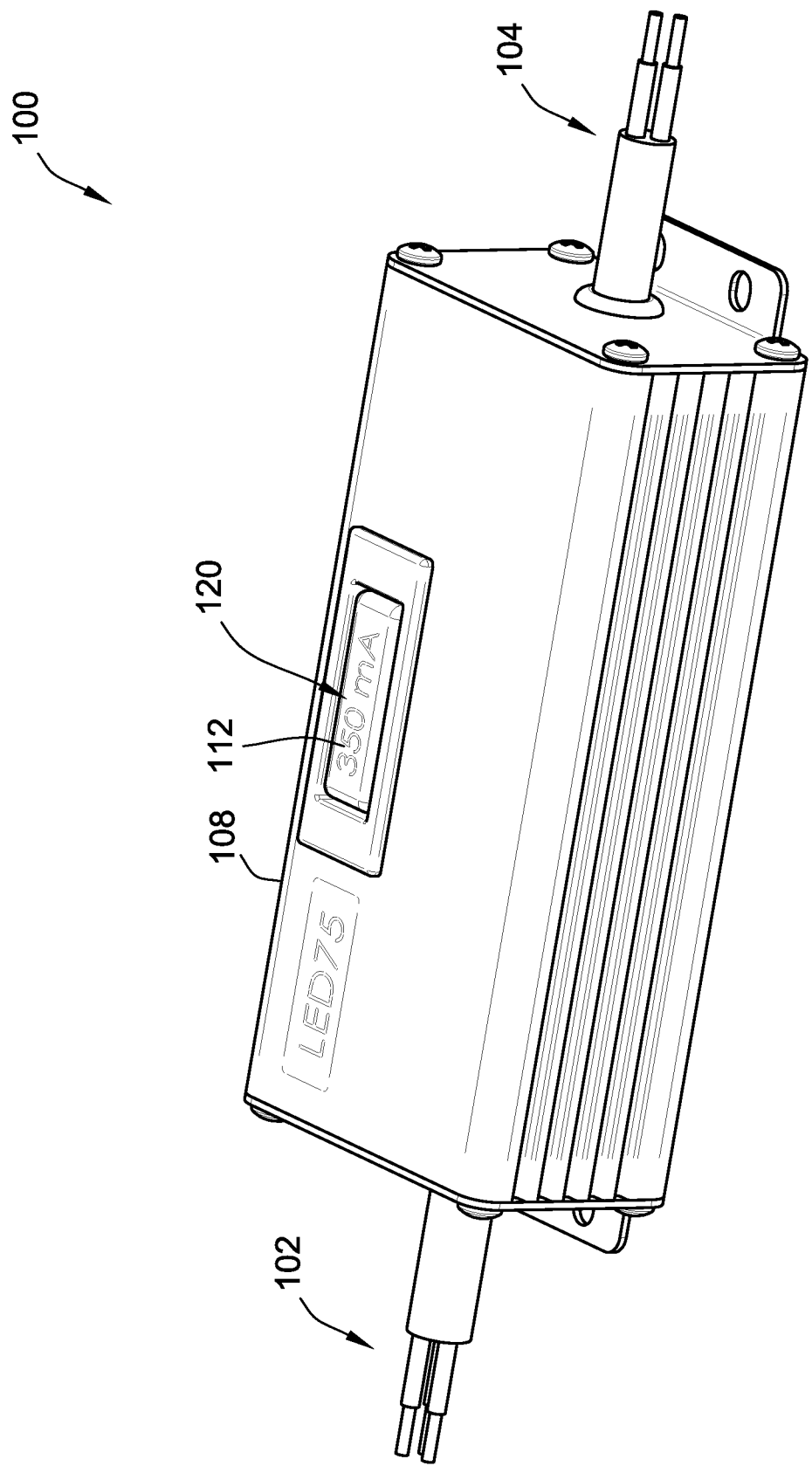
FIG. 1 is a perspective view of an power supply for LED lighting, constructed in accordance with an embodiment of the invention.
Figure 2:
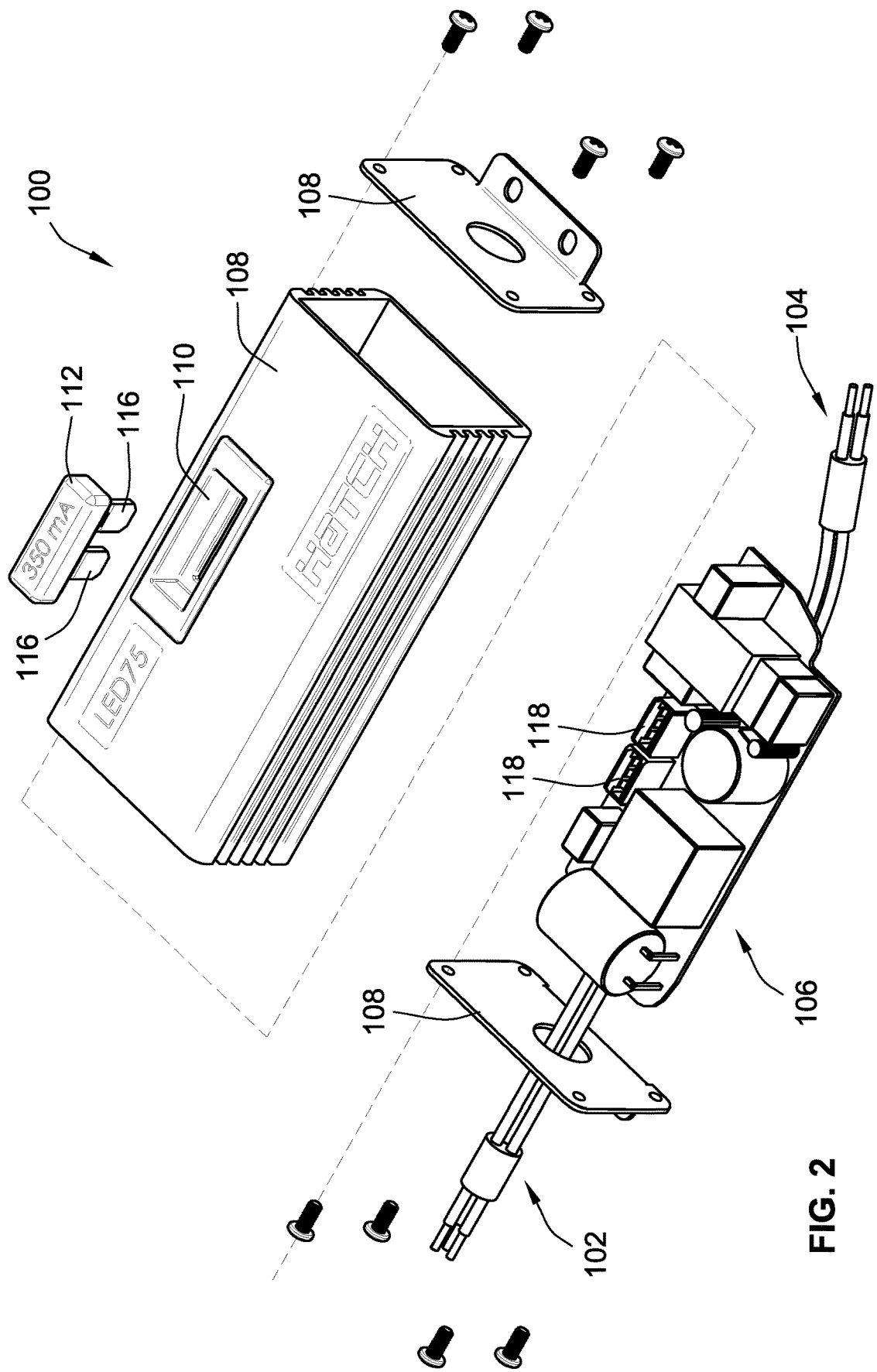
FIG. 2 is an exploded view of the power supply of FIG. 1.

FIGS. 1 and 2 illustrate a perspective view of a power supply 100 that may provide electrical power for HID, CFL, LED, or incandescent lighting, or for any number of other electrical devices, and an exploded view of the power supply 100 of FIG. 1, respectively. The power supply 100 has input terminals 102 to receive an electrical input and circuitry 106 to generate an electrical output on output terminals 104. The circuitry 106 is contained within a housing 108, which has an opening 110 configured to receive a removable plug-in cartridge 112. The housing 108 may be made from metal or from plastic, depending on the application. The opening 110 may be a slotted or rectangular opening, as shown in FIGS. 1 and 2, sized to provide a snug fit for the removable plug-in cartridge 112.

Figure 3:
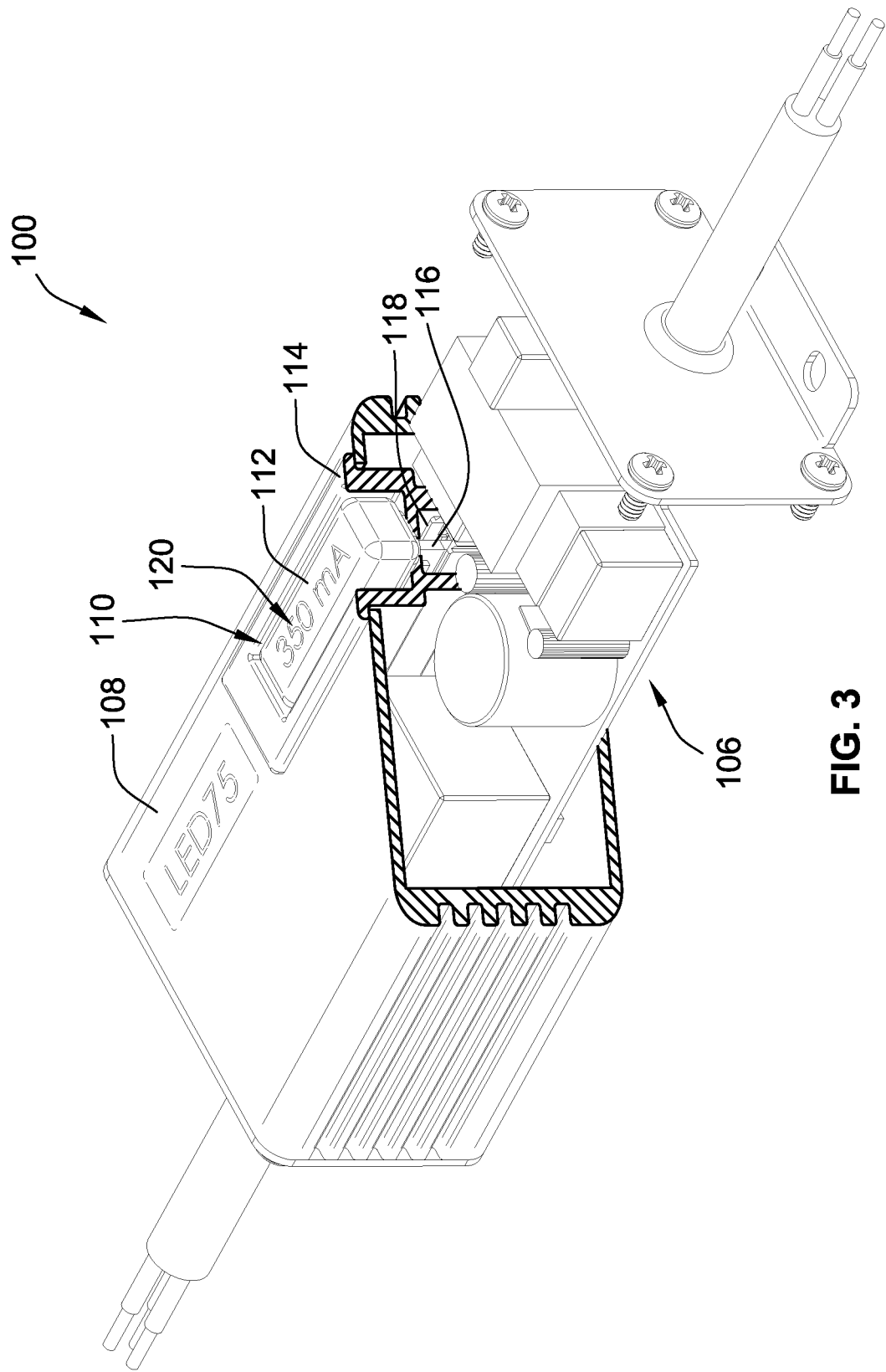
FIG. 3 is a perspective view of an LED driver with a section of the housing removed, constructed in accordance with an embodiment of the invention.

However, the embodiment of FIG. 3 shows the metal housing 108 with an insert 114 inserted into the opening 110. The insert 114 may be made from rubber, plastic, or a similarly suitable material, and serves to protect the removable plug-in cartridge 112 from damage by the edges of the metal housing. The insert 114 may also extend downward to the circuitry 106 of the power supply 100 and serve as a guide for insertion of the removable plug-in cartridge 112.

Figure 4:
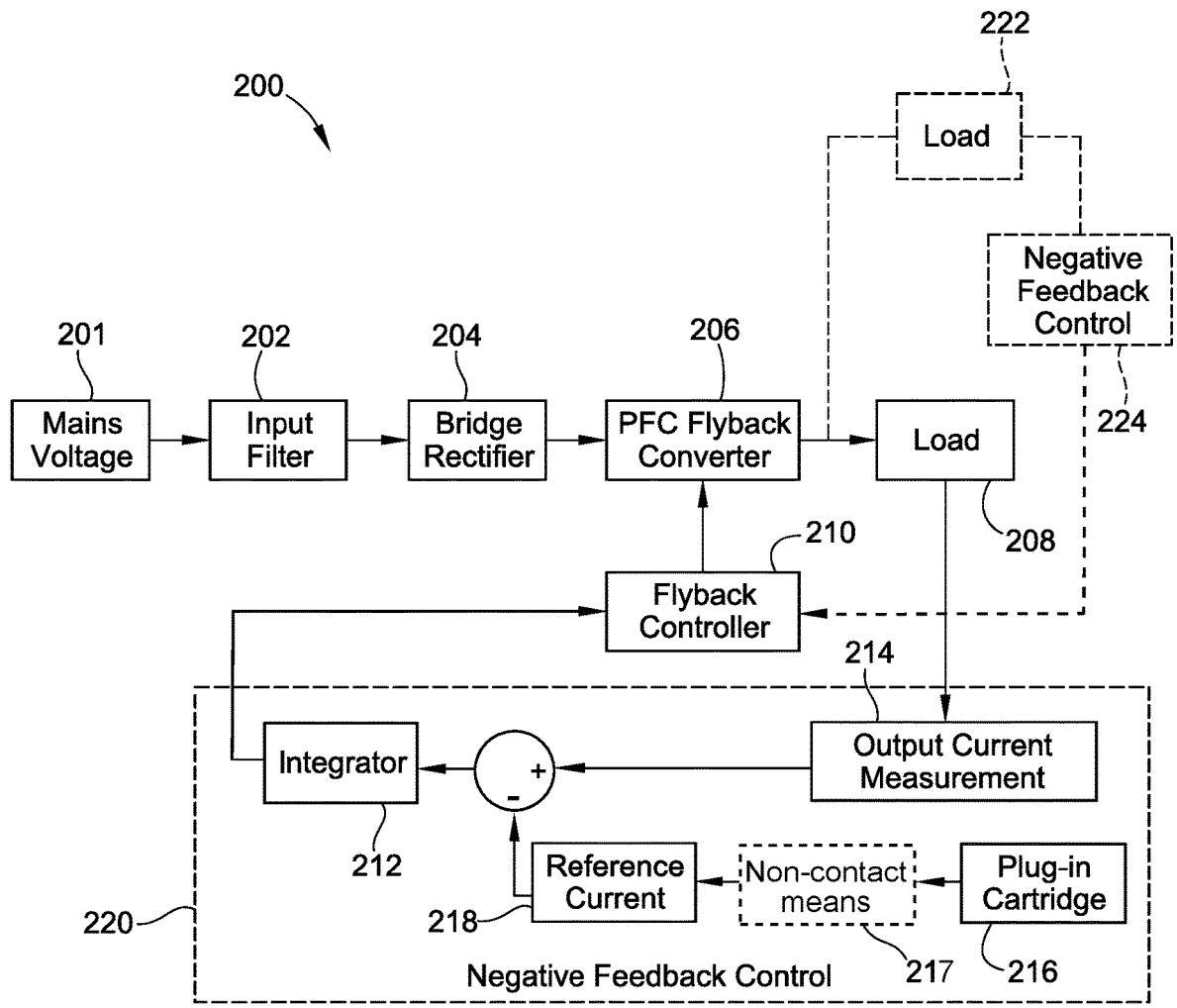
FIG. 4 is a block diagram of an LED driver circuit that accepts the removable plug in cartridge for altering the output current of the LED driver circuit.

FIG. 4 is a schematic block diagram of a representative LED driver circuit 200, according to an embodiment of the invention. In the exemplary embodiment shown, the output current of the LED driver circuit 200 is controlled by the user based on the selection of a removable plug in cartridge 216. However, in alternate embodiments, illustrated in FIG. 4, the mains voltage 201 is passed through an input filter 202 and is full wave rectified by a bridge rectifier 204. This rectified voltage is then converted by a PFC flyback converter 206, for example, to the load voltage for powering the LED load 208. A current sensing circuit 214 then senses the current flowing through the LED load 208. This load current is then compared against a reference current to determine the error. The error (difference between actual load current and reference current) is then integrated by integrator 212 to determine how long the error has been present. The cumulative error is then passed to the flyback controller 210. The flyback controller 210 operates such that a larger cumulative error causes the flyback controller 210 to operate the PFC flyback converter 206 such that the error is reduced. This is a representation of a negative feedback control system 220, where the variable being regulated is the load current. This negative feedback control system 220 could be modified by measuring the load voltage and comparing this to the reference voltage to develop an error. Also, in an alternate embodiment, the LED driver circuit 200 could be configured to drive multiple loads. FIG. 4 shows a second load 222 in phantom, this second load 222 having its own measurement negative feedback control system 224 with its own reference block for developing the error.

The removable plug in cartridge 216 has encoded information that changes the reference current produced by a reference current generator 218. By changing the reference current, the feedback control system 220 will regulate the load current to the new reference current. By doing so, one can change the load current by simply changing the removable plug in cartridge to one that has a separate encoded reference current value.

In certain embodiments, the removable plug-in cartridge 112, 216 is configured to set the current output from a constant current power supply to a predetermined current level, or in alternate embodiments, configured to set the voltage output from a constant voltage power supply to a predetermined voltage level. The removable plug-in cartridge 112, 216 may be constructed such that it has an attribute that is detectable by the power supply where the attribute is representative of a desired output of the power supply. In one embodiment, this attribute could be the value of a resistor, where the resistive value of the resistor is representative of the desired output current and/or voltage.

Referring again to FIGS. 1-3, in a particular embodiment, the circuitry 106 includes two receptacles 118, and the removable plug-in cartridge 112 includes two terminals 116, each designed for insertion into a respective one of the two mating receptacles 118. As can be seen from FIGS. 1-3, the removable plug-in cartridge 112 includes visible marking 120, which shows the output current for a constant current power supply 100, or, alternatively, shows the output voltage for a constant voltage power supply 100. Alternatively, a percentage of the maximum regulated output characteristic may be shown on the removable plug-in cartridge, such that the same plug-in cartridge could be used across multiple power supply models.

Thus, a user can fashion a power supply to provide a limited number of desired output currents or voltages by merely swapping out the removable plug-in cartridge 112 for one with the desired current or voltage rating. As such, one power supply can satisfy a wide range of user needs. Also, because the current or voltage to be output by the power supply is clearly shown on the plug-in cartridge, user-caused errors are less likely. Also, OEMs who use these power supplies as a component of their own products, can stock a single power supply that is used in many of their own products, where each product is fitted with a different plug-in cartridge that matches the product's requirements.

In another embodiment of the invention, the power supply 100 includes a non-contact means 217 (as shown in FIG. 4) for selecting power supply output current, or output voltage, such as, but not limited to, the interruption of a beam of light from an LED to a receiving photodiode such that the power supply 100 mechanically interrupts or passes the beam causing a signal current or no-signal current to flow in the receiving photodiode, depending on the presence or non-presence of an interruptor to the beam of light from the LED. In an exemplary embodiment, a multiplicity of pairs of LEDs and photodiodes, incorporated in the circuitry 106, can be arranged to coincide with possible light paths, which may be arranged so as to interrupt or allow the passage of light between the LED and the photodiode. The removable plug-in cartridge 112 may be configured to interrupt light beams in the manner described. In such an arrangement of pairs of LEDs and photodiodes, the electrical signal from the photodiode can be decoded, in at least one instance, as a binary number such that certain binary numbers correspond to certain power supply 100 output currents or voltages.

In alternate embodiments, other non-contact means 217 (as shown schematically in FIG. 4) for selecting power supply 100 output current or voltage are also envisioned. These include, but are not limited to, power supplies 100 in which the removable plug-in cartridge 112 includes some combination of magnetic parts with reed switches or Hall Effect devices arranged to encode power supply 100 output currents or voltages, and non-contact means 217 having inductively-coupled elements where a parameter of the inductively-coupled elements is read and may correspond to a particular driver output current or voltage of the power supply 100. It should be noted that other non-contact means 217 for selecting or adjusting power supply 100 output current or voltage not mentioned here are not excluded from the invention.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A power supply that provides electrical power at a predetermined level to a lighting system, the power supply comprising:
   a housing having an opening configured to receive a removable plug-in cartridge which includes an attribute that is representative of a desired output value for the power supply;
   wherein the removable plug-in cartridge is configured to modify a reference current in order to maintain an output value for the power supply at the desired output value.

2. The power supply of claim 1, wherein the removable plug-in cartridge is marked with a current value, the removable plug-in cartridge being configured to set the output value of the power supply to a respective current value.

3. The power supply of claim 1, wherein the removable plug-in cartridge is marked with a relative value, the removable plug-in cartridge being configured to set an output current level relative to an input current level.

4. The power supply of claim 1, wherein the removable plug-in cartridge is configured to set one or more desired output values for the power supply having a plurality of outputs.

5. The power supply of claim 4, further comprising a separate negative feedback control system for each of the plurality of outputs.

6. The power supply of claim 1, further comprising a negative feedback control system configured to compare the reference current to a power supply load current, wherein the negative feedback control system determines a difference between the reference current and the power supply load current, the difference being used by the negative feedback control system to adjust a power supply output current.

7. The power supply of claim 1, wherein the lighting system comprises one of an LED lighting system, a CFL lighting system, a HID lighting system, or an incandescent lighting system.

8. The power supply of claim 1, wherein an electrical power output of the power supply ranges from 1 watt to 100 watts.

9. The power supply of claim 1, further comprising a negative feedback control system, wherein the negative feedback control system and the removable plug-in cartridge include corresponding inductively-coupled elements, wherein a parameter of the inductively-coupled elements determines the reference current, the inductively-coupled elements including a combination of magnetic components and reed switches.

10. A method of supplying electrical power to a lighting system, the method comprising the steps of:
providing a removable plug-in cartridge having markings related to a desired value of an electrical output of a constant-current power supply unit;
configuring the constant-current power supply unit to receive the removable plug-in cartridge such that the removable plug-in cartridge operates to set an output value of the constant-current power supply unit to the desired value.

11. The method of claim 10, wherein the desired value is a current value.

12. The method of claim 10, wherein the desired value is a color temperature value.

13. The method of claim 10, wherein the desired value is a relative value, and wherein the removable plug-in cartridge is configured to set the output value for the constant-current power supply unit relative to an input value for the constant-current power supply unit.

14. The method of claim 10, further comprising configuring the removable plug-in cartridge to modify a reference current in order to maintain the output value of the constant-current power supply unit at the desired value.

15. The method of claim 14, further comprising:
measuring a current from a load being supplied by the constant-current power supply unit;
comparing the measured current from the load to the reference current; and
using the results of said comparing to adjust the current supplied to the load.

16. The method of claim 10, wherein the constant-current power supply unit has a plurality of outputs, and wherein providing the removable plug-in cartridge comprises providing the removable plug-in cartridge configured to set output values for the plurality of outputs.

17. The method of claim 16, further comprising providing a separate negative feedback control system, configured to compare a reference current to a load current of the constant-current power supply unit, for each of the plurality of outputs.

* * * * *